United States Patent [19]
Tam et al.

[11] Patent Number: 6,067,573
[45] Date of Patent: May 23, 2000

[54] TECHNIQUE FOR REDUCING THE FLOW OF TOPOLOGY INFORMATION IN A COMPUTER NETWORK TO ONLY NODES THAT REQUIRE THE INFORMATION

[75] Inventors: Ulrica Tam, Belmont; Steven H. Berl, Piedmont; Leo Pereira, Fremont; Dario Calia, San Jose, all of Calif.; John David Billings, Chapel Hill; David Scott McCowan, Raleigh, both of N.C.

[73] Assignee: Cisco Technology, Inc., San Jose, Calif.

[21] Appl. No.: 08/926,539

[22] Filed: Sep. 10, 1997

[51] Int. Cl.[7] .............................. G06F 13/38; G06F 15/17
[52] U.S. Cl. ............................................ 709/242; 709/229
[58] Field of Search .................................... 709/226, 240, 709/223, 229, 242; 370/255, 257

[56] References Cited

U.S. PATENT DOCUMENTS

| | | | |
|---|---|---|---|
| 5,715,395 | 2/1998 | Brabson et al. | 395/200.13 |
| 5,845,091 | 12/1998 | Dunne et al. | 395/200.7 |
| 5,870,385 | 2/1999 | Ahmadi et al. | 370/252 |

OTHER PUBLICATIONS

IBM, "Systems Network Architecture Formats", Publication No. GA27–3136–16; Oct. 1996.

IBM, "Systems Network Architecture, APPN Architecture Reference", Publication No. SC30–3422–04; Dec. 1996.

Nilausen, Jesper—APPN Networks; John Wiley & Sons, Ltd. 1994; APPN Basics 2:11–83.

*Primary Examiner*—Mark H. Rinehart

[57] ABSTRACT

A mechanism limits the flow of topology information to only those nodes of a computer network that require the information. The mechanism comprises a filter having a plurality of conditions that are evaluated by a node of the network prior to forwarding the topology information to another node. Specifically, the conditions are evaluated with respect to lists of nodes that are defined according to the configuration of the network. By applying the filtering conditions to the defined lists, each node may selectively propagate the topology information throughout the network, thereby substantially reducing the amount of information flowing over the network.

18 Claims, 4 Drawing Sheets

TECHNIQUE FOR REDUCING THE FLOW OF TOPOLOGY INFORMATION IN A COMPUTER NETWORK TO ONLY NODES THAT REQUIRE THE INFORMATION

FIELD OF THE INVENTION

The invention relates to computer networks and, more particularly, to the selective propagation of topology information among nodes of a computer network.

BACKGROUND OF THE INVENTION

Data communication in a computer network involves the exchange of data between two or more entities interconnected by communication links and subnetworks. These entities are typically software programs executing on hardware computer platforms, such as end stations and intermediate stations. Examples of an intermediate station may be a router or switch which interconnects the communication links and subnetworks to enable transmission of data between the end stations. A local area network (LAN) is an example of a subnetwork that provides relatively short distance communication among the interconnected stations; in contrast, a wide area network (WAN) enables long distance communication over links provided by public or private telecommunications facilities.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modern communications network architectures are typically organized as a series of hardware and software levels or "layers" within each station. These layers are arranged to form a protocol stack that functions to format data for transfer between, e.g., a source station and a destination station communicating over the network. Specifically, predetermined services are performed on the data as it passes through each layer and the layers communicate with each other by means of the predefined protocols. An example of such a communications architecture is the Systems Network Architecture (SNA) developed by International Business Machines (IBM) Corporation.

SNA is a mainframe-oriented network architecture that defines a plurality of hardware and software components or nodes that are interconnected to form a hierarchically-structured network. These nodes include host subarea or data centre nodes, such as core or back-bone router and virtual telecommunications access method (VTAM) resources, that control and manage a SNA network, and communication controller subarea or remote site nodes that route and control the flow of data to other resources, such as end stations, of the network.

In general, most resources of the SNA network require access to only those resources in the data centre. That is, applications executing on the end stations typically require access only to the data centre nodes, and such access is generally realized through logical units (LU) of the stations and nodes. Accordingly, in a typical SNA network, a communication session may connect two LUs in a LU-LU session. Activation and deactivation of such a session is addressed by functions of an Advanced Peer to Peer Networking (APPN) architecture.

The APPN architecture also defines a plurality of nodes that interact to form an APPN network. These nodes typically include APPN network nodes and APPN end nodes. An APPN router node is a full-functioning APPN network node having all APPN base service capabilities including topology and routing services (TRS) functions, whereas an APPN end node is capable of performing only a subset of the functions provided by an APPN network node. APPN nodes and TRS functions are well-known and are, for example, described in detail in *Systems Network Architecture Advanced Peer to Peer Networking Architecture Reference* IBM Doc SC30-3422 and *APPN Networks* by Jesper Nilausen, printed by John Wiley and Sons, 1994, at pgs 11–83.

Most APPN networks evolve from SNA networks; as a result, these APPN networks have generally the same hierarchical structure, i.e., data centre and remote site nodes, and session access requirements of an SNA network. For example, the LU of an end station typically communicates over an LU-LU session with a corresponding LU in the data centre. A control point (CP), configured as an APPN network node server, typically calculates the route to be used for the session using TRS, including the session routing information, in response to a LOCATE request provided over a CP-CP session between the end node and the network node server.

TRS involves management and maintenance of information relating to the topology of the APPN network, including the network nodes, their interconnecting communication links, characteristics and state information of the nodes and links, and the state of the CP sessions. Such information is contained in a topology database of each network node; specifically, the topology database contains detailed information on all links of a "transmission group" (TG) between APPN network nodes, TG characterstics and TG status, in addition to information on all network nodes, node characteristics and node status.

To ensure the accuracy of TRS functions, the topology databases of the network nodes must be consistent, particularly when changes occur to the network. The APPN architecture, in an attempt to maintain database consistency, specifies that every network node in an APPN network exchange its network topology information with other network nodes. When a change to the network is detected, the network node typically "floods" topology database update (TDU) information over CP sessions to all network nodes, including the remote site nodes, to ensure rapid convergence of topology information. A TDU typically includes (i) a resource identifier identifying the resource (node or TG) to which the update information applies, (ii) resource characteristics representing updated values for the changed characteristics, and (iii) a resource sequence number for determining whether TDU has previously been received and registered by a receiving node.

If a link between a data centre network node and a remote site network node fails, the data centre node generates and floods a TDU reflecting this topology change over CP sessions to all network nodes including the network nodes of other remote sites in the network. Yet these remote site network nodes do not require knowledge of the failure because they only communicate with resources in the data centre. In a large APPN network, the flow of such TDU information is significant and, in many cases, may impact performance of the network. The present invention is directed to solving the problem of reducing the flow of topology information among nodes of a computer network.

SUMMARY OF THE INVENTION

The invention comprises a technique for limiting the flow of topology information to only those nodes of a computer network that require the information. The technique involves the use of a filter having a plurality of conditions that are evaluated by a node of the network prior to forwarding the topology information to another node. Specifically, the conditions are evaluated with respect to lists of nodes that are defined according to the configuration of the network. By applying the filtering conditions to the defined lists, each node may selectively propagate the topology information throughout the network, thereby substantially reducing (or even completely eliminating) the amount of information flowing over the network.

In the illustrative embodiment, the computer network is preferably a hierarchically-structured, Advanced Peer to Peer Networking (APPN) network having a plurality of nodes organized as a data centre and remote sites. The nodes are preferably APPN network nodes classified as members of either a data centre list comprising nodes within the data centre or a remote site list comprising network nodes within the remote sites. In addition, the filter is a topology database update (TDU) filter that enables the selective propagation of TDU information among those nodes.

According to the invention, the data centre network nodes apply the filtering technique to determine which nodes should receive the TDU information. The filter ensures that the remote sites only receive information about data centre nodes. In other words, the filter specifies that the data centre nodes do not forward the TDU information of a remote site to the network nodes of other remote sites; that information is only forwarded to the nodes of the data centre list. This ensures that remote site nodes only receive information necessary to perform route calculation operations, thereby reducing the overall flow of information in the network. A reduction in the flow of information also results in a reduction in the CPU resources needed to forward the information and the memory resources needed to store the information at the remote sites. Such reduction conserves bandwidth and, in the case of wide area network links to the remote network nodes, allows those links to be used more efficiently.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
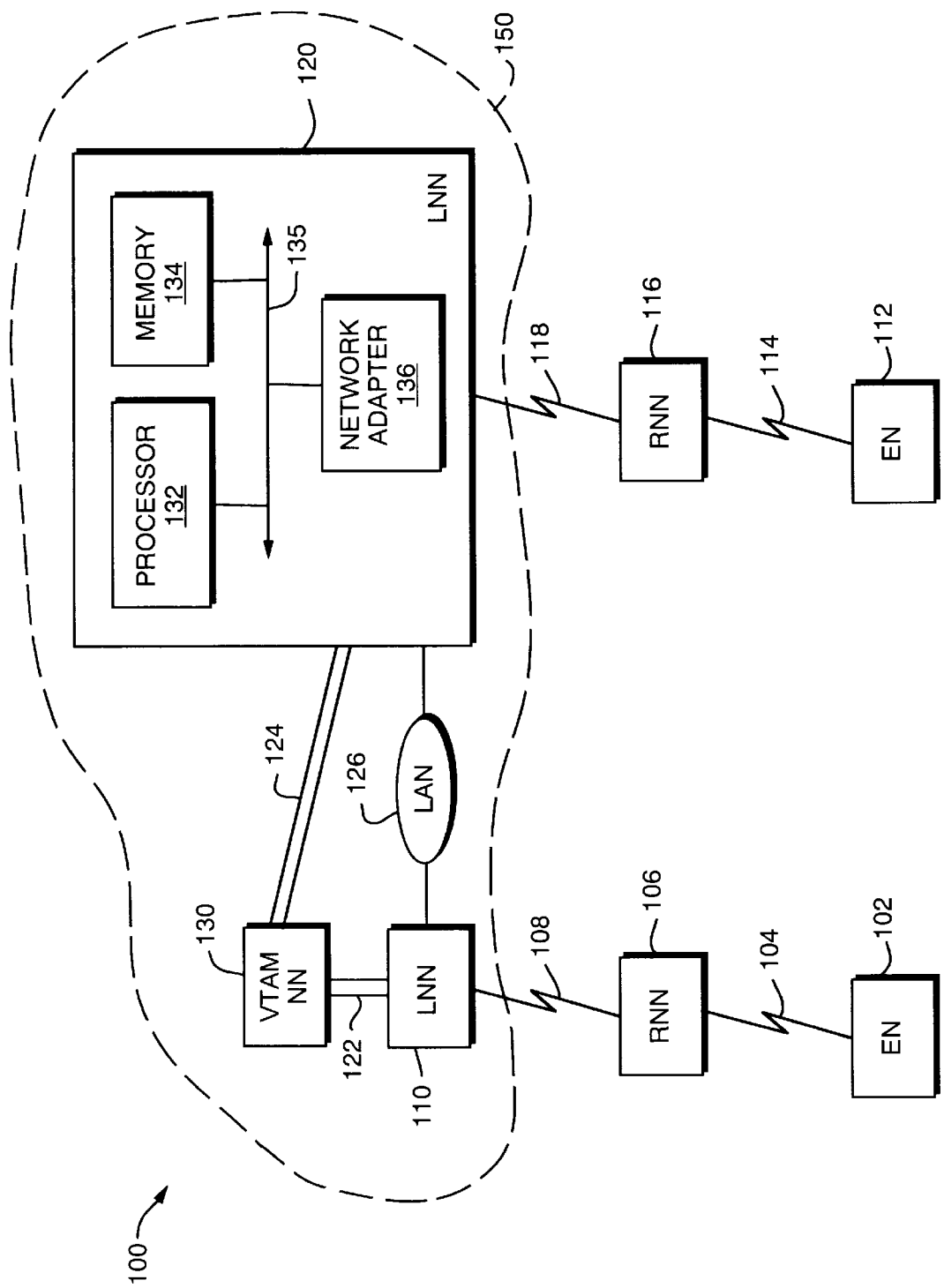
FIG. 1 is a schematic block diagram of an Advanced Peer to Peer Networking (APPN) network including a plurality of APPN nodes interconnected by communication links on which the present invention may advantageously operate.

FIG. 1 is a schematic block diagram of an Advanced Peer to Peer Architecture (APPN) network 100 comprising a plurality of nodes interconnected by communication links. Specifically, end station nodes (EN) 102, 112 are coupled to remote site router nodes 106 and 116, configured as APPN remote network nodes (RNN), via communication links 104, 114, respectively. Preferably, the end stations are APPN end nodes, although the stations may comprise other types of nodes such as Low Entry Networking nodes or Physical Units 2.0 via Dependent Logical Unit Requestor functions. RNNs 106, 116 are further coupled to data centre router nodes 110, 120, which are configured as APPN local network nodes (LNN), via communication links 108, 118. The LNNs are interconnected by a local area network (LAN) 126 and are further connected to a virtual telecommunications access method (VTAM) network node (NN) 130 via channel, i.e., bus, attachments 122, 124 to form data centre 150.

In the illustrative embodiment, the LNNs of data centre 150 are preferably core or back-bone routers. Moreover, the communication links are preferably wide area network (WAN) links, such as X.25, and the LAN is preferably a token ring, although other links and LANs may be advantageously used. Communication among the nodes of the data centre 150 and remote sites of network 100 is typically effected by exchanging discrete data packets or frames via sessions between the communicating nodes.

Each node typically comprises processor means 132, memory means 134 and network adapter means 136, the latter for connecting the node to the network, interconnected by bus 135. The memory means 134 may comprise memory locations for storing software programs (e.g., data and instructions) and data structures associated with the filtering algorithms and techniques described herein. The processor means 132 may comprise processing elements or logic for executing the software programs, including an operating system and applications, and for generating the stored data structures. It will be apparent to those skilled in the art that other processor and memory means, including various computer readable media, may be used for storing and executing program instructions (preferably in the processor, but also on the network adapter) pertaining to the techniques described herein.

Figure 2:
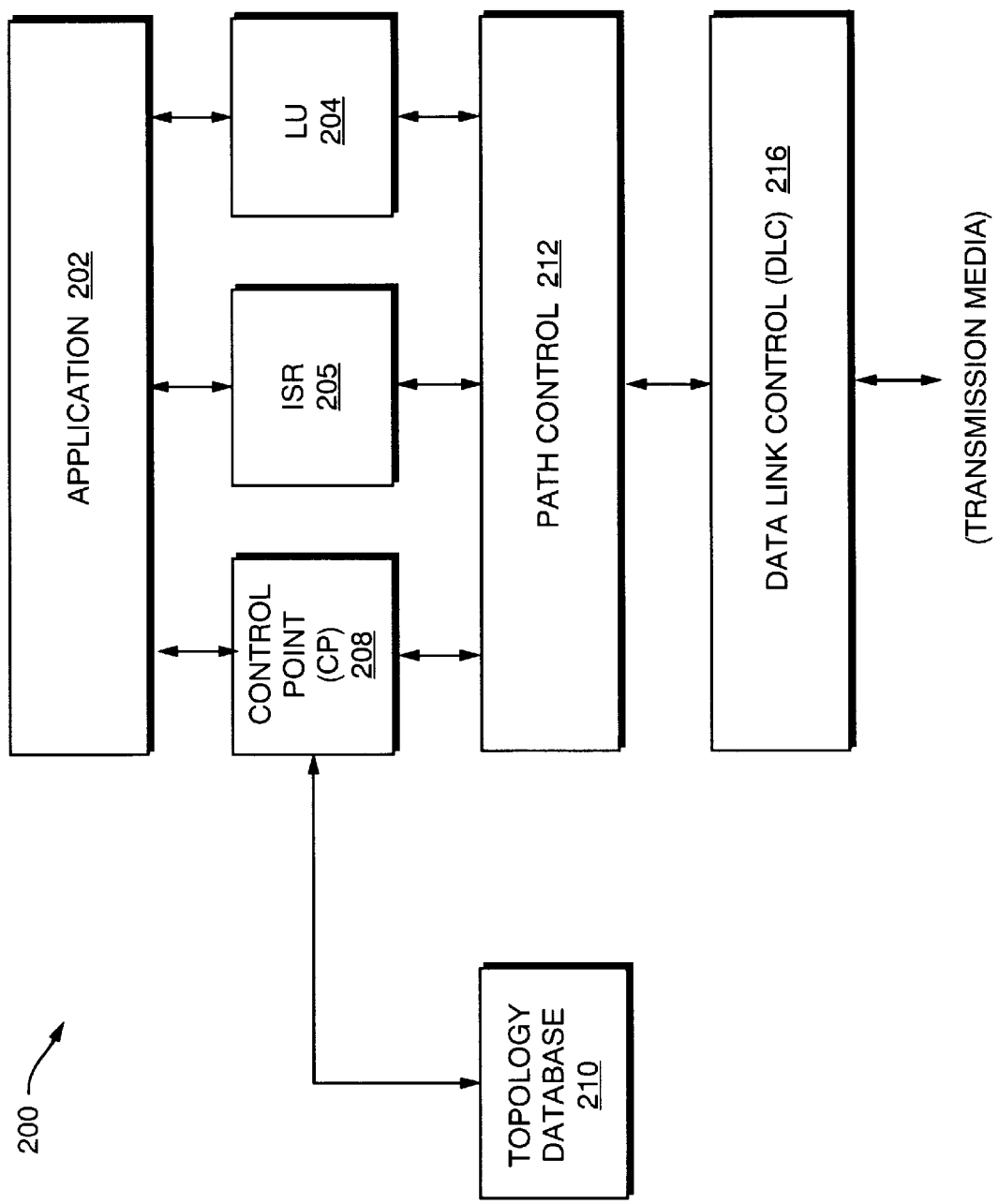
FIG. 2 is a schematic block diagram of the software architecture of an APPN node.

FIG. 2 is a schematic block diagram of the software architecture of an APPN node 200. Application 202 executing on an APPN node, such as EN 102 of network 100, communicates with another node, such as VTAM NN 130, through a LU-LU session; LU 204 within each node functions as both a logical port to the network and as an end point of the communication session. The session generally passes through a path control module 212 and a data link control (DLC) module 216 of the node, the latter of which connects to various network transmission media.

When functioning as an APPN router node, an intermediate session routing (ISR) module 205 maintains a portion of the session in each "direction" with respect to an adjacent node. During session establishment, path control 212 and ISR 205 are invoked to allocate resources for the session. Collectively, these individually-established "local" sessions form the logical communication session between the LUs 204 of the APPN end node 102 and APPN network node 130.

As noted, each APPN network node is capable of performing topology and routing services (TRS) functions using information relating to the topology of the APPN network. Such information is contained in a topology database 210 of each APPN network node 200; the database 210 is managed by a control point (CP) module 208. Specifically, the topology database contains detailed information on all links, i.e., transmission groups (TG), and CP sessions between APPN network nodes, TG characteristics and TG status, in addition to information on all network nodes, node characteristics and node status.

To ensure the consistency of the topology database across the APPN network, each network node exchanges topology database update (TDU) information with the other network nodes. The CP module 208 coordinates the TDU exchanges through CP-CP sessions with other CP modules of adjacent network nodes. Yet there are some network nodes that do not require knowledge of certain updates to the network topology because they only communicate with resources in the data centre.

As described herein, a technique is provided for limiting the flow of TDU information to only those network nodes of the APPN network that require the information. The technique involves the use of a TDU filter having a plurality of conditions that are evaluated by a network node prior to forwarding the topology information to an adjacent node. Specifically, the conditions are evaluated with respect to lists of network nodes that are defined (either manually or automatically) according to the configuration of the network. These lists include a data centre list comprising network nodes within the data centre and a remote site list comprising network nodes within the remote sites.

Figure 3:
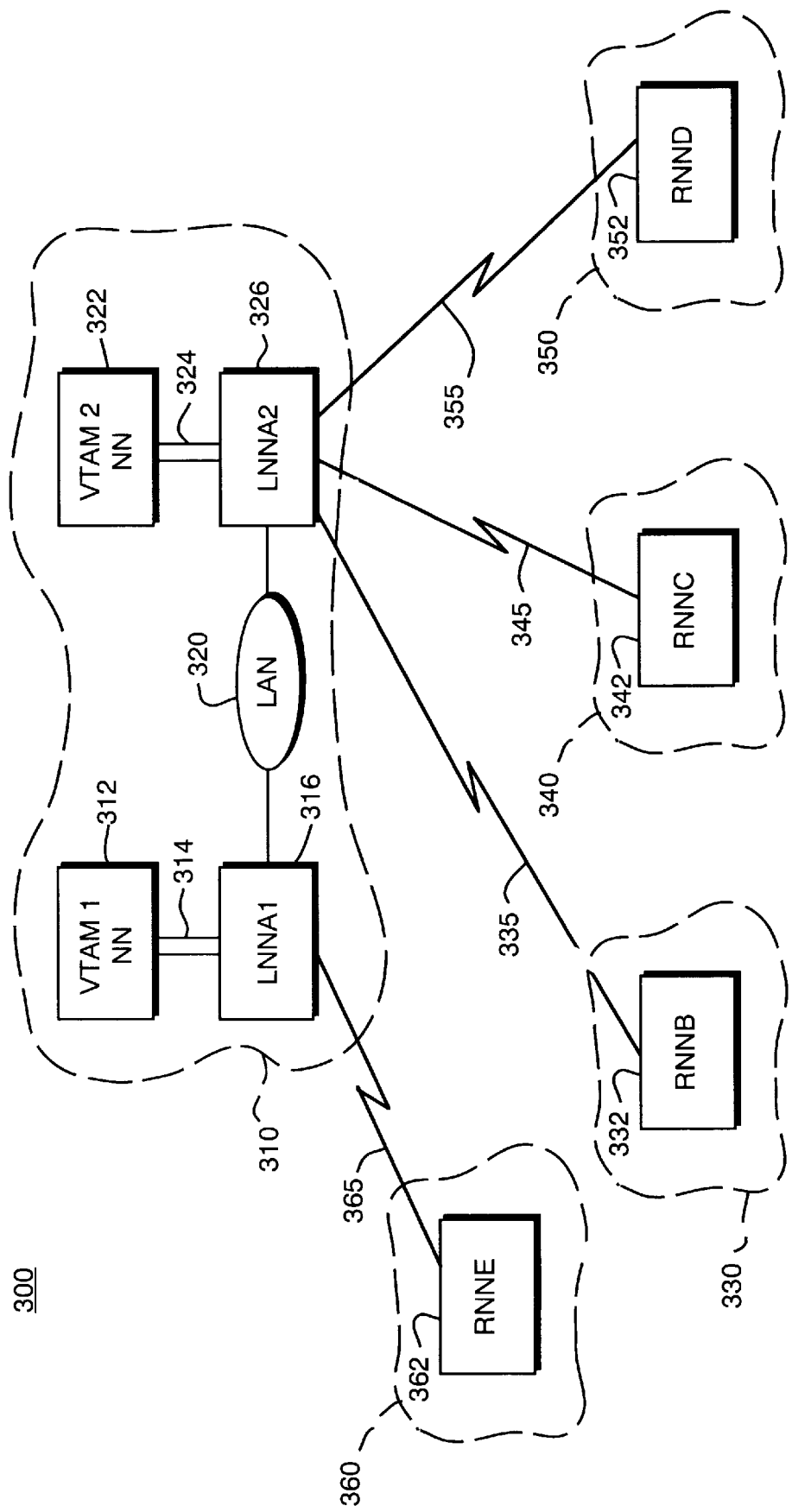
FIG. 3 is a schematic block diagram of an alternate embodiment of an APPN network having a data centre and remote sites on which the present invention may advantageously operate.

FIG. 3 is a schematic block diagram of an alternate embodiment of an APPN network 300 having a data centre 310 and remote sites 330–360 on is which the present invention may advantageously operate. Here, data centre 310 preferably comprises VTAM1 NN 312 coupled to LNNA1 316 via channel attachment 314 and VTAM2 NN 322 coupled to LNNA2 326 via channel 324. LNNA1 316 and LNNA2 326 are further interconnected by LAN 320. There are three (3) remote site router nodes connected to LNNA2: RNNB332 of remote site 330 by way of WAN link 335, RNNC 342 of remote site 340 via WAN link 345 and RNND 352 of remote site 350 by way of WAN link 355. In addition, there is a RNNE router node 362 of remote site 360 connected to LNNA1 316 via WAN link 365. Therefore, the data centre list comprises node members VTAM1, VTAM2, LNNA1 and LNNA2, and the remote site list comprises nodes RNNB, RNNC, RNND and RNNE. It should be noted, however, that in yet another alternate embodiment of the APPN network, the data centre may include non-VTAM application hosts or even no hosts at all.

If WAN link 345 fails, LNNA2 326 generates the following TDU reflecting the change in topology of the network:

CV44(RNNC) & CV46(real-partner-CP-name== LNNA2)

Table 1

Note that CV44 (cpname) is a Node Descriptor control vector specified in the "APPN architecture, TDU GDS Variable (X'12C2)" and CV46 (real-partner-CP-name== cpname) is a TG Descriptor control vector specified in the "APPN architecture, TDU GDS Variable (X'12C2)". Each of these references are described in detail in *Systems Network Architecture Formats*, published by IBM, publication GA27-3136. Note also that the TDU may include other control vectors and that only the relevant ones are disclosed herein. Moreover, it should be noted that a TDU may be generated for any other condition justifying a TDU exchange as disclosed in the *Systems Network Architecture Advanced Peer to Peer Networking Architecture Reference* published by IBM, Doc SC30-3422.

Typically, LNNA2 distributes, i.e., "floods", this TDU to all nodes of the network, including those nodes of other remote sites. In accordance with the invention, however, LNNA2 326 applies the following inventive TDU filter and its corresponding conditions prior to forwarding the TDU over the network:

IF (TDU_receiver is not a member of the remote_site list)
OR
(NN descriptor is a member of the data_centre list) && (TG_partner is a member of the data_center list)
OR
(NN_descriptor==TDU_receiver)||(TG_partner== TDU_receiver)
THEN send TDU to TDU_receiver Table 2

The term TDU_receiver denotes the network node receiving the TDU. For ease of description, NN_descriptor, which is CV44 (cpname), denotes the network node described by the topology update information and TG_partner, which is CV46 (real-partner-CP-name== cpname), denotes the network node directly linked to NN_descriptor.

Figure 4:
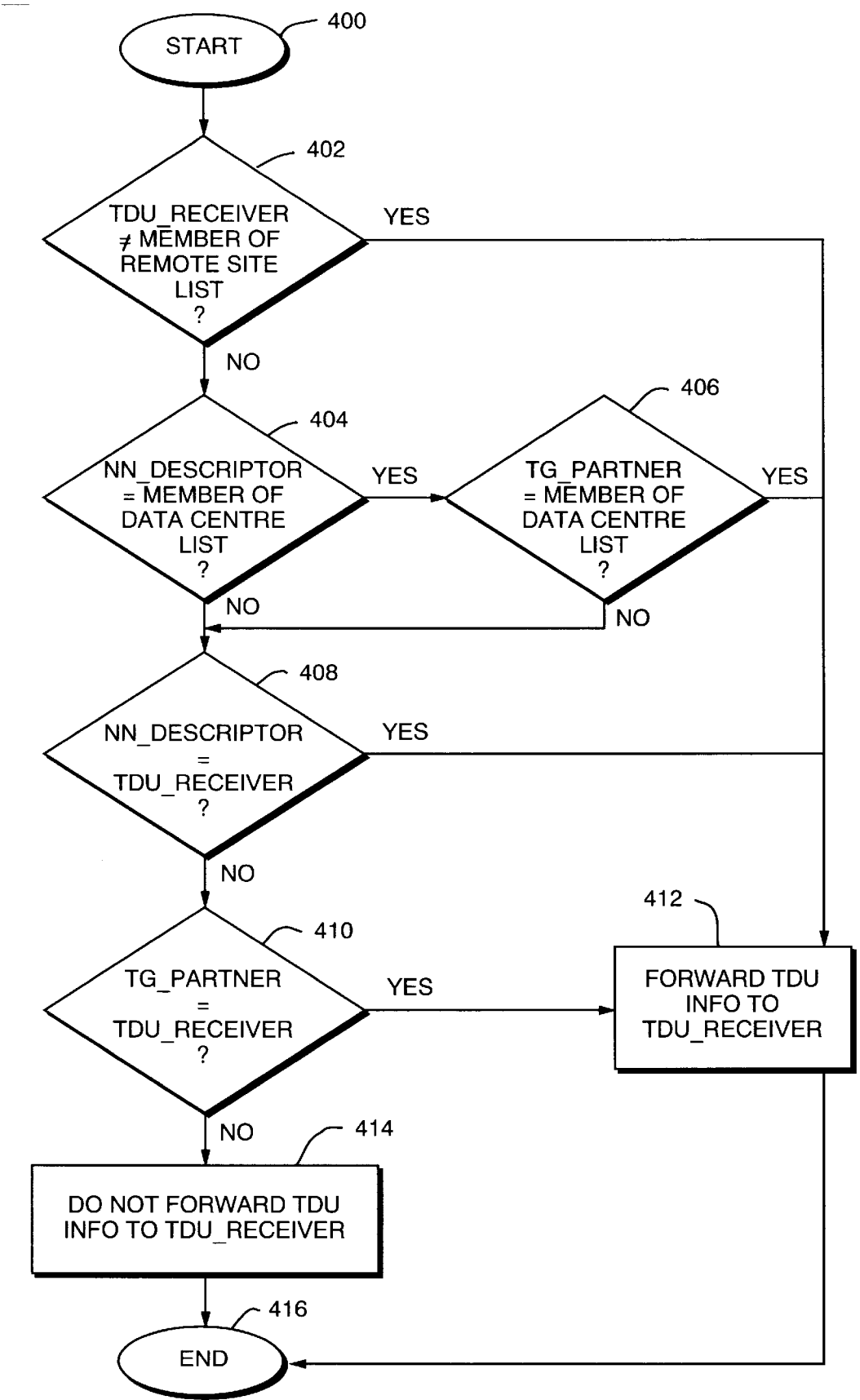
FIG. 4 is a flowchart illustrating conditions of a topology database update (TDU) filter in accordance with the invention.

In general, those network nodes that are members of the data centre list apply the filtering technique to each adjacent network node to determine which of the nodes should receive the TDU information. FIG. 4 is a flowchart illustrating the evaluation process involving the TDU filter conditions in accordance with the invention. The process starts at Step 400 and proceeds to Step 402 where a data centre node determines if the TDU_receiver is not a member of the remote site list. If the receiving node is not a member (i.e., Yes branch), the process proceeds to Step 412 and the data centre node forwards the TDU to the TDU_ receiver. The process then ends at Step 416.

If the receiving node is a member of the remote site list (i.e., No branch of Step 402), the data centre node then determines whether the NN_descriptor is a member of the data centre list (Step 404) and, if it is, determines whether the TG_partner is also a member of the data centre list in Step 406. If so, the TDU is forwarded to the TDU_receiver; however, if the determination is negative for both steps, then the process proceeds to Step 408 where it is determined whether NN_descriptor is the TDU_receiver. If it is not, then the data centre node determines whether TG_partner is the TDU_receiver in Step 410. If the answer to this latter inquiry is no, the data centre node does not forward the TDU to the TDU_receiver (Step 414). However, if the determination in Steps 408 and 410 is positive (i.e., Yes branch), then the TDU is forwarded to the TDU_receiver in Step 412. The process then ends in Step 416.

By applying the filtering conditions to the lists defined above, each network node selectively propagates the TDU information to certain adjacent network nodes, thereby substantially reducing the amount of information flowing over the network. As an example, refer to FIGS. 3 and 4, and Tables 1 and 2 herein. If WAN link 345 fails, LNNA2 applies the inventive filtering technique to adjacent nodes LNNA1 316, VTAM2 322, RNNB 332 and RNND 352; in other words, each of these adjacent nodes are evaluated as a TDU_receiver. It should be noted that, for this example, NN_descriptor is RNNC 342 and TG_partner is LNNA2 326.

Case #1: LNNA1 316 is the TDU_receiver. Here, LNNA1 is not a member of the remote site list so the condition specified in Step 402 evaluates to true and the TDU is forwarded to LNNA1.

Case #2: VTAM2 322 is the TDU_receiver. This node is also not a member of the remote site list so the condition of Step 402 is true and the TDU of Table 1 is forwarded to VTAM2.

Case #3: RNNB 332 is the TDU_receiver. RNNB is a member of the remote site list, the condition specified in Step 402 evaluates to false and the next condition (Step 404) is evaluated. Since RNNC is not a member of the data centre list, this condition also evaluates to false. Moreover, the conditions of Steps 408 and 410 evaluate to false because neither the NN_descriptor (Step 408) nor the TG_partner (Step 410) are RNNB. As a result, LNNA2 does not forward the TDU to RNNB 332.

Case #4: RNND 352 is the TDU receiver. RNND is a member of the remote site list, the condition specified in Step 402 evaluates to false and the next condition (Step 404) is evaluated. Since RNNC is not a member of the data centre list, this condition also evaluates to false. Moreover, the conditions of Steps 408 and 410 evaluate to false because neither the NN_descriptor (Step 408) nor the TG_partner (Step 410) are RNND. As a result, LNNA2 does not forward the TDU to RNND 352.

In summary, the TDU filtering technique specifies that data centre nodes generally do not forward the TDU information to the network nodes of the remote site list; that information is only forwarded to the nodes of the data centre list. This ensures that remote site nodes only receive relevant information necessary to perform route calculation operations. Such relevant information includes, but is not limited to, all node and TG information needed to reach a source/destination.

An advantage of the present invention is a reduction in the overall flow of information in the network. A reduction in the flow of information further results in a reduction in the CPU resources needed to forward the information and the memory resources needed to store the information at the remote sites. Such reduction conserves bandwidth and, in the case of wide area network links to the remote network nodes, allows the links, CPU cycles and memory to be used more efficiently.

While there has been shown and described illustrative embodiments for selectively propagating topology information to nodes of a computer network, it is to be understood that various other adaptations and modifications may be made within the spirit and scope of the invention. For example, the TDU filtering technique described herein is generated for implementation within a hierarchically-structured computer network or service provider network wherein sessions only exist between a resource in a remote site and a resource in a data centre. If the inventive filtering technique is to be implemented in a network environment having limited peer-to-peer (e.g., RNN-to-RNN) communication, then in yet another alternate embodiment of the invention, the defined lists of nodes must be modified so that the remote site resources communicating over a session are members of the data centre list.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for limiting the flow of topology information to selected nodes of a computer network having a configuration of a data centre of local network nodes coupled to a plurality of remote sites of remote network nodes, the method comprising the steps of:

providing, at each local network node, a filter having conditions that limit the local network nodes from forwarding the topology information of a remote site to remote networks nodes of other remote sites;

defining lists of nodes according to the configuration of the network, the defined lists including a data centre list comprising a list of local network nodes and a remote site list comprising a list of remote network nodes; and applying the conditions to the defined lists at the local network node to enable forwarding of the topology information to the selected nodes of the network.

2. The method of claim 1 wherein the topology information is a topology database update (TDU) reflecting a change in topology of the network and wherein each selected node is a TDU receiver.

3. The method of claim 2 wherein the TDU describes a specific network node affected by the change in topology of the network and wherein the local network node is a partner network node directly linked to the specific network node by way of a transmission group.

4. The method of claim 3 wherein the step of applying the conditions to the defined lists comprises the step of determining whether the TDU receiver is a member of the remote site list.

5. The method of claim 4 wherein the step of applying the conditions to the defined lists further comprises the step of determining whether the specific network node is a member of the data centre list and, if so, whether the partner network node is a member of the data centre list.

6. The method of claim 5 wherein the step of applying the conditions to the defined lists comprises the step of determining one of whether the specific network node is the TDU receiver and whether the partner network node is the TDU receiver.

7. Apparatus for selectively propagating topology information throughout a hierarchically-structured computer network having a configuration of a data centre connected to a plurality of remote sites of remote network nodes, the apparatus comprising:

a local network node of the data centre coupled to a remote network node of a remote site by way of a transmission group;

means, coupled to the local network node, for implementing a filter having conditions that are evaluated with respect to lists of nodes defined according to the configuration of the network, the conditions limiting the local network node from forwarding the topology information of the remote site to other remote networks nodes of other remote sites; and means, coupled to the local network node, for applying the conditions to the defined lists in response to an event changing the configuration of the network to enable the local network node to forward the topology information to selected nodes of the network.

8. The apparatus of claim 7 wherein the defined lists include a data centre list comprising local network nodes of the data centre and a remote site list comprising remote network nodes of the remote sites.

9. The apparatus of claim 8 wherein the event comprises one of a failure of the transmission group (TG) coupling the remote network node to the local network node and a condition justifying a TDU exchange.

10. The apparatus of claim 9 wherein the topology information is a topology database update (TDU) describing the remote node affected by a change in topology of the network due to the failure of the TG and wherein each selected node is a TDU receiver.

11. The apparatus of claim 10 wherein a first of the conditions of the filter comprises a determination of whether the TDU receiver is a member of the remote site list.

12. The apparatus of claim 11 wherein a second of the conditions of the filter comprises a determination of whether the remote network node is a member of the data centre list and, if so, whether the local network node is a member of the data centre list.

13. The apparatus of claim 12 wherein a third of the conditions of the filter comprises a determination of one of whether the remote network node is the TDU receiver and whether the local network node is the TDU receiver.

14. A computer readable medium containing executable program instructions and associated with a local processing node capable of selectively propagating topology information throughout a hierarchically-structured computer network having a configuration of a data centre connected to a plurality of remote sites by way of transmission groups (TG), the executable instructions containing program instructions for:

providing, at the local processing node, a filter having conditions that limit the local processing node from forwarding the topology information of a remote site to other remote sites;

defining lists of nodes according to the network configuration, the defined lists comprising a data centre list of additional local processing nodes of the data centre and a remote site list of remote processing nodes of the remote sites; and applying the conditions to the defined lists at the local processing node to direct forwarding of the topology information to selected nodes of the network.

15. The medium of claim 14 wherein the topology information is a topology database update (TDU) describing one of the remote processing nodes affected by a change in topology of the network due to a failure of a corresponding TG coupling the remote processing node to the local processing node, and wherein each selected node is a TDU receiver.

16. The medium of claim 15 wherein the program instructions for applying comprises program instructions for determining whether the TDU receiver is a member of the remote site list.

17. The medium of claim 16 wherein the program instructions for applying further comprises program instructions for determining whether the remote processing node is a member of the data centre list and, if so, whether the local processing node is a member of the data centre list.

18. The medium of claim 17 wherein the program instructions for applying still further comprises program instructions for determining one of whether the remote network node is the TDU receiver and whether the local network node is the TDU receiver.

* * * * *